United States Patent
Lee et al.

(10) Patent No.: US 10,726,530 B2
(45) Date of Patent: Jul. 28, 2020

(54) PERSONAL IMMERSION DISPLAY DEVICE AND DRIVING METHOD THEREOF

(71) Applicant: LG DISPLAY CO., LTD., Seoul (KR)

(72) Inventors: Hochul Lee, Paju-si (KR); Sanglyn Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/201,375

(22) Filed: Nov. 27, 2018

(65) Prior Publication Data

US 2019/0164260 A1 May 30, 2019

(30) Foreign Application Priority Data

Nov. 28, 2017 (KR) .................. 10-2017-0160310

(51) Int. Cl.
| | |
|---|---|
| *G06T 5/00* | (2006.01) |
| *G09G 3/3233* | (2016.01) |
| *G09G 3/3275* | (2016.01) |
| *G09G 3/20* | (2006.01) |
| *G09G 3/3266* | (2016.01) |

(52) U.S. Cl.
CPC .............. *G06T 5/006* (2013.01); *G09G 3/20* (2013.01); *G09G 3/3233* (2013.01); *G09G 3/3275* (2013.01); *G09G 3/3266* (2013.01); *G09G 2310/08* (2013.01); *G09G 2340/14* (2013.01)

(58) Field of Classification Search
CPC ............ G06T 5/006; G09G 2320/0285; G09G 2360/12; G09G 2340/045; G09G 3/3266; G09G 2310/08; G09G 2340/14; G09G 3/3275; G09G 3/3233; G09G 3/20; G02B 27/0172; G02B 2027/0178; G02B 2027/011
See application file for complete search history.

(56) References Cited

U.S. PATENT DOCUMENTS

| | | | |
|---|---|---|---|
| 2007/0188506 A1* | 8/2007 | Hollevoet | G06T 1/60 345/530 |
| 2016/0155421 A1* | 6/2016 | Han | G09G 5/006 345/213 |
| 2017/0206689 A1* | 7/2017 | Eo | G06T 3/0093 |

* cited by examiner

*Primary Examiner* — Nicholas R Wilson
(74) *Attorney, Agent, or Firm* — Birch, Stewart, Kolasch & Birch, LLP

(57) ABSTRACT

An augmented/virtual reality device includes a display panel, a driver, an optical lens and a timing controller. The display panel displays image and the driver drives the display panel. The optical lens penetrates the image displayed on the display panel. The timing controller performs an image processing for compensation which converts flat image data input from outside into distorted image data and supplies the distorted image data to the driver.

12 Claims, 12 Drawing Sheets

(a)

(b)

PERSONAL IMMERSION DISPLAY DEVICE AND DRIVING METHOD THEREOF

This application claims the priority benefit of Korean Patent Application No. 10-2017-0160310, filed in the Republic of Korea on Nov. 28, 2017, which is incorporated herein by reference for all purposes as if fully set forth herein.

BACKGROUND OF THE INVENTION

Field of the Invention

The present invention relates to a personal immersion display device and a method for driving the personal immersion display device which can implement a virtual reality and an augmented reality.

Discussion of the Related Art

With the development of information technology, the market for displays that play an intermediary role between users and information is growing. Thus, display devices based on a display element such as a liquid crystal display (LCD), a field emission display (FED), a light emitting display (LED), an electrophoresis display (EPD), and the like are increasingly used.

A display device implements a display panel based on various types of display elements. A display device includes a display panel including a plurality of subpixels, a driver for driving the display panel, a power supply unit for supplying power to the display panel, and so on. The driver can include a scan driver for supplying scan signals or gate signals to the display panel and a data driver for supplying data signals to the display panel. The display device can be used as an augmented/virtual reality device as well as a television, a video player, a personal computer, a home theater, a smartphone.

A personal immersion display device such as the augmented/virtual reality device among the display devices above listed displays an image through a lens, unlike other display devices. A display device for displaying an image through a lens such as the augmented/virtual reality device cannot use commonly used image data, and therefore requires a compensated image processing considering a lens distortion. However, in a conventional method, there is a problem that the amount of computation and the time for generating an image increase as a resolution increases, so it needs to be improved.

SUMMARY OF THE INVENTION

An embodiment of the present invention provides an augmented/virtual reality device comprising a display panel, a driver, an optical lens and a timing controller. The display panel displays images and the driver drives the display panel. The optical lens penetrates the image displayed on the display panel. The timing controller performs an image processing for compensation which converts flat image data input from outside into distorted image data and supplies the distorted image data to the driver.

Another aspect of the present invention provides a method for driving a personal immersion display device comprising a display panel for displaying image, a driver for driving the display panel, an optical lens penetrating the image displayed on the display panel, and a timing controller for controlling the driver. The method comprises receiving flat image data from outside, and converting the flat image data into distorted image data via an operation based on a lookup table. The converting step is performed via the timing controller.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail embodiments of the invention examples of which are illustrated in the accompanying drawings.

Hereinafter, specific embodiments according to the present invention will be described with reference to the accompanying drawings.

The embodiments of the present invention described below can be implemented based on a display element such as a liquid crystal display (LCD), a field emission display (FED), a light emitting display (LED), an electrophoresis display (EPD), and the like. Hereinafter, an organic light emitting display device will be described as an example of the light emitting display.

The display device described below according to the embodiments of the present invention can be implemented as a personal immersion display device such as an augmented/virtual reality device as well as a television, a video player, a personal computer PC, a home theater, and a smart phone. The display device described below is useful especially in implementing the augmented/virtual reality device. All the components of the display devices according to all embodiments of the present invention are operatively coupled and configured.

Figure 1:
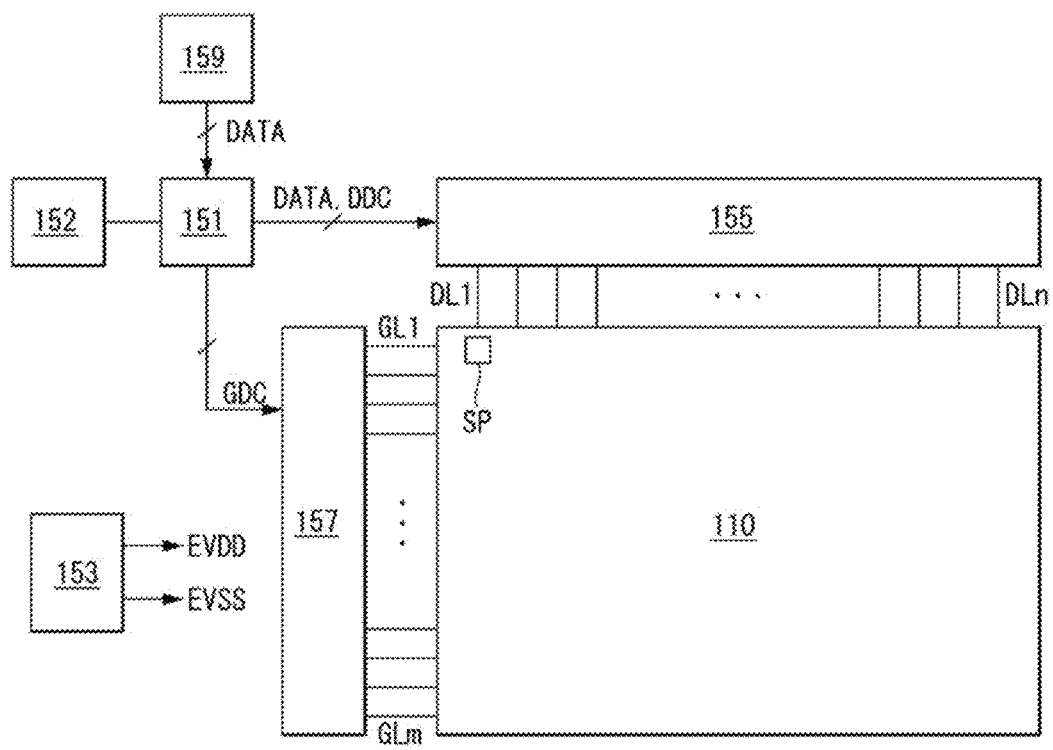
FIG. 1 is a schematic block diagram of an organic electroluminescent display device according to an embodiment of the present invention.
Figure 2:
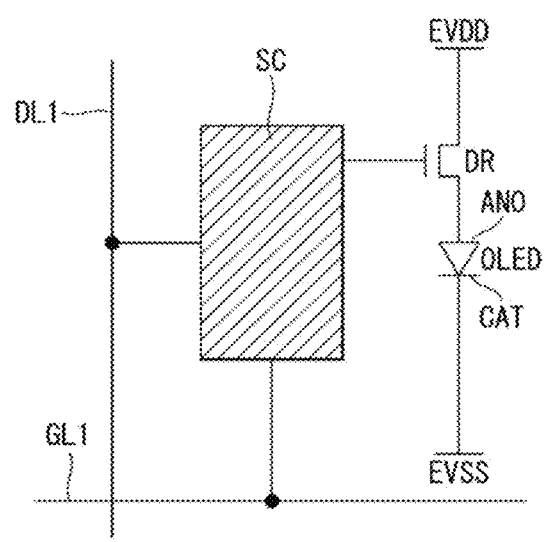
FIG. 2 is a schematic circuit configuration diagram of a subpixel according to an example of the present invention.
Figure 3:
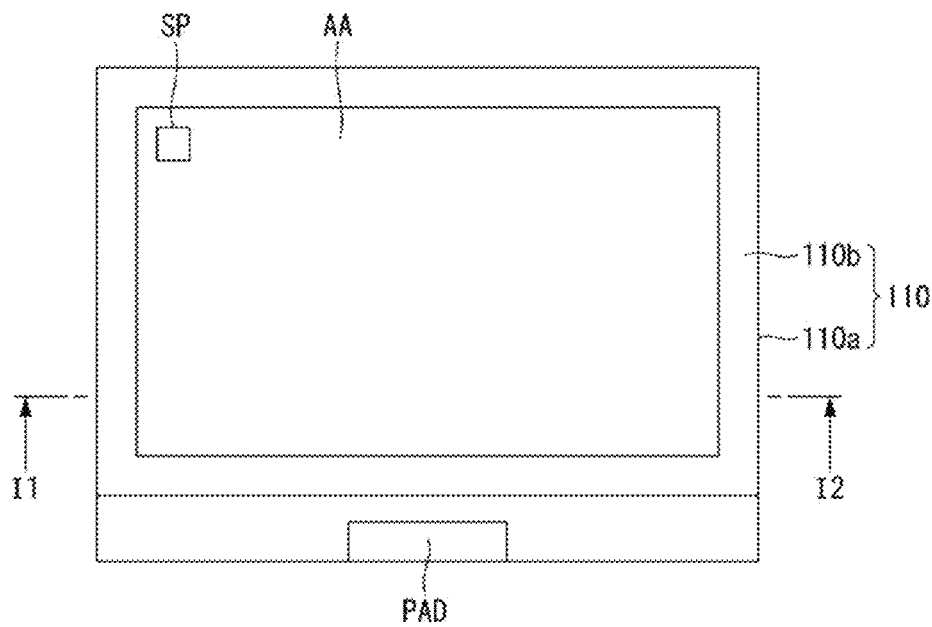
FIG. 3 is a plan view of a display panel according to an example of the present invention.

FIG. 1 is a schematic block diagram of an organic electroluminescent display device according to an embodiment of the present invention, FIG. 2 is a schematic circuit configuration diagram of a subpixel according to an example of the present invention, and FIG. 3 is a plan view of a display panel according to an example of the present invention.

As shown in FIG. 1, the organic electroluminescent display device can comprise a timing controller 151, a memory unit 152, a data driver 155, a scan driver 157, a display panel 110 and a power supply unit 153.

The timing controller 151 is supplied with data signals DATA and driving signals including a data enable signal, a vertical synchronization signal, a horizontal synchronization signal, clock signals, et al. from an image processor. The timing controller 151 outputs gate timing control signals GDC for controlling driving timings of the scan driver 157 and data timing control signals DDC for controlling driving timings of the data driver 155. The timing controller 151 can be realized in a form of an integrated circuit IC.

In response to the data timing control signals DDC received from the timing controller 151, the data driver 155 samples and latches the data signal DATA supplied from the timing controller 151, converts the digital data signal into an analog data signal (or a data voltage) based on gamma reference voltages and outputs the analog data signal. The data driver 155 outputs the data voltage through data lines DL1 to DLn. The data driver 151 can be formed as an IC.

In response to the gate timing control signals GDC received from the timing controller 151, the scan driver 157 output the scan signals. The scan driver 157 output the scan signals through scan lines GL1 to GLm. The scan driver 157 can be form as an IC or formed in a Gage In Panel GIP scheme (the scheme of forming transistor by a thin film process)

The power supply unit 153 outputs a high potential power voltage and a low potential power voltage. The high potential power voltage and the low potential power voltage output from the power supply unit 153 are supplied to the display panel 110. The high potential power voltage is supplied to the display panel 110 through a first power line EVDD and the low potential power voltage is supplied to the display panel 110 through a second power line EVSS. The power supply unit 153 can be formed as an IC.

The display panel 110 displays an image based on the data voltages supplied from the data driver 155, the scan signals supplied from the scan driver 157 and power supplied from the power supplied unit 153. The display panel 110 includes subpixels SP emitting light to display image. An example of each of one or more of the subpixels SP is shown in FIG. 2.

The subpixels SP can comprise red subpixels, green subpixels and green subpixels or white subpixels, red subpixels, green subpixels and green subpixels. At least one of the subpixels SP can have an emitting area different from other subpixels depending on emitting characteristics. And the subpixels can have various shapes such as triangle, rectangle, polygon, circle, oval, etc.

As shown in FIG. 2, one subpixel is located in the intersection area of the data line DL1 and the scan line GL1, and includes a programming unit SC for setting a gate-source voltage of a driving transistor DR and an organic light emitting diode OLED. The subpixel can be configured to comprise two transistors and one capacitor 2T1C, 3T1C, 4T2C, 5T2C, 6T2C, 7T2C, etc, depending on the configuration of the transistors and capacitors included in the programming unit SC.

The OLED includes an anode ANO, a cathode CAT and an organic light emitting layer disposed between the anode ANO and the cathode CAT. The anode ANO is connected to the driving transistor DR.

The programming unit SC can be implemented as a transistor unit including at least one switching transistor and at least one capacitor. The transistor unit can be implemented based on a CMOS semiconductor, a PMOS semiconductor or an NMOS semiconductor. The transistors included in the transistor unit can be implemented in a p type or an n type. And, the semiconductor layer of the transistors included in the transistor unit of the subpixel can comprise amorphous silicon, polysilicon or an oxide.

The switching transistor which is turned on in response to the scan signal supplied via the scan line GL1 applies the data voltage from the data line DL1 to one electrode of the capacitor. The driving transistor DR controls an emitting amount of the OLED by controlling a current according to the level of the voltage charged in the capacitor. The emitting amount of the OLED is proportional to the current amount supplied from the driving transistor DR. And, the subpixel is connected to the first and second power lines EVDD and EVSS to receive the high and low potential power voltages.

As shown in FIG. 3, the display panel 110 includes a lower substrate 110a, an upper substrate 110b, a display area AA, and a pad portion PAD. The display area AA comprises the subpixels SP emitting light. The subpixels SP in the display area AA are sealed because they are vulnerable to moisture or oxygen, but the pad portion PAD comprises pads for electrical connection with an external substrate, so that the pad portion PAD is exposed to the outside.

The display area AA can be disposed to occupy almost all the surfaces of the lower substrate 110a and the pad portion PAD can be disposed at one side of the lower substrate 110a. The display panel 110 is implemented in a rectangular shape as an example, but can be formed in various shapes such as a pentagon, a hexagon, a polygon, a circle, and an ellipse.

Figure 4:
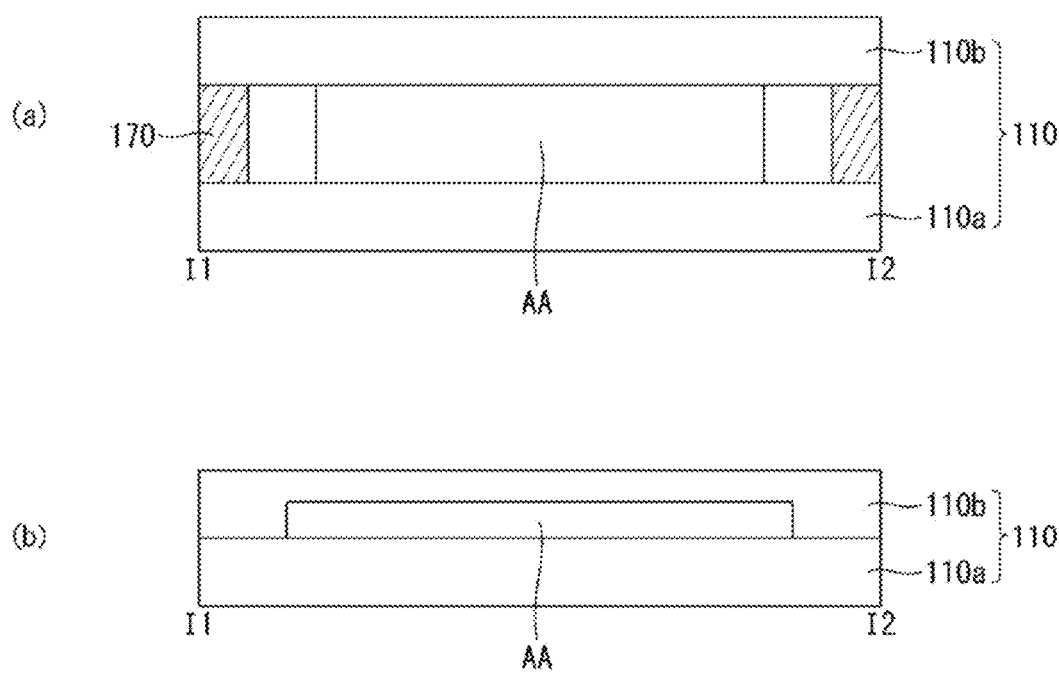
FIG. 4 is a cross-sectional exemplary view of the region I1-I2 of FIG. 3.

As shown in FIGS. 3 and 4(a), the display area AA can be sealed by sealing members 170 disposed between the lower substrate 110a and the upper substrate 110b. AS shown in FIGS. 3 and 4(b), the display area AA can be sealed only by the lower substrate 110a and the upper substrate 110b.

The display panel 110 can have various shapes such as a flattened shape, a shape that can be flexibly bent or unfolded, a shape having a curved surface, and the like. And, the display panel 110 can be implemented in a bottom emission structure in which light is emitted toward the lower substrate 110a, a top emission structure in which light is emitted toward the upper substrate 110b, a dual emission structure in which light is emitted toward the lower substrate 110a and the upper substrate 110, etc. So, the sealing structure of the display panel 110 can be selected according to the type to be implemented, and is not limited to the description of FIGS. 3 and 4.

Figure 5:
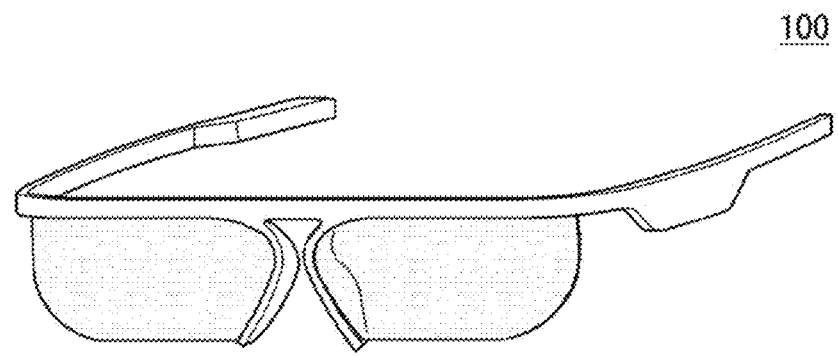
FIG. 5 is an illustration of an augmented/virtual reality device.
Figure 6:
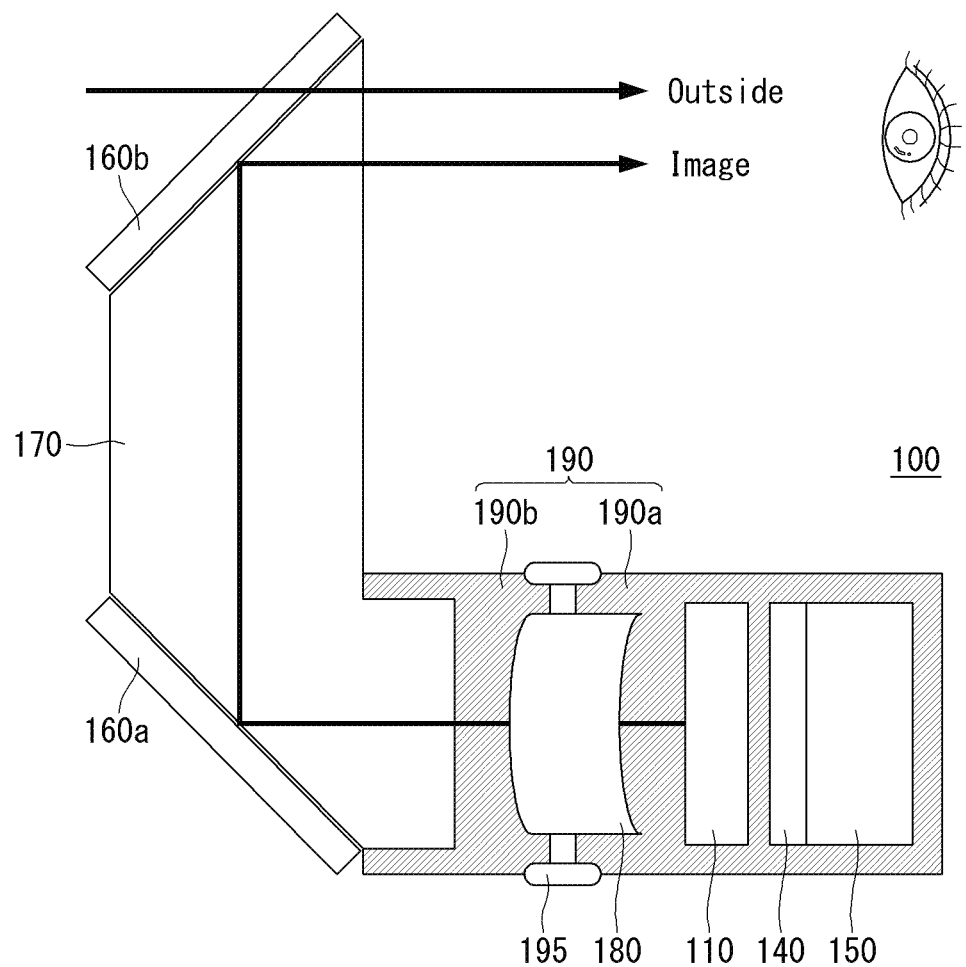
FIG. 6 is an enlargement of a portion of FIG. 5.
Figure 7:
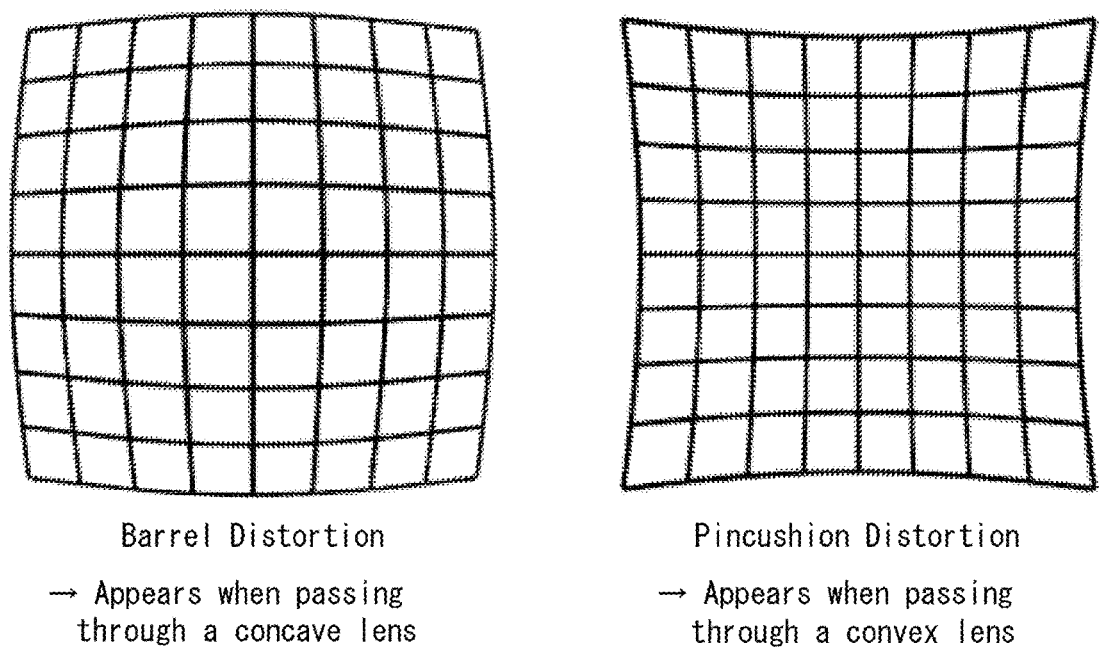
FIG. 7 is a view showing distortion of an image due to a lens.

FIG. 5 illustrates an augmented/virtual reality device, FIG. 6 enlarges a portion of FIG. 5 and FIG. 7 shows distortion of an image due to a lens.

As shown in FIGS. 5 to 7, the augmented/virtual display device 110 can comprise a display panel 110, a flexible circuit board 140, a printed circuit board 150, a first mirror 160a, a second mirror 160b, a light guide 170, an optical lens 180, a fastening part 195 and a housing 190.

The housing 190 serves to accommodate the devices configuring the augmented/virtual display device 110, for example the display panel, the flexible circuit board 140, the printed circuit board 150 and the like. The housing 190 can comprise a first housing 190a and a second housing 190b. The first and second housings 190a and 190b can be physically coupled by the fastening part 195.

The display panel 110 and the printed circuit board 150 are electrically connected by the flexible circuit board 140. The scan driver can be arranged in the display panel in the form of the gate in panel. The data driver in the form of an IC can be disposed in the printed circuit board 150. In the printed circuit board 150, the timing controller and the power supply unit are disposed in the form of ICs.

The optical lens 180 is disposed at a front of a display area of the display panel 110. The optical lens 110 can be selected as a lens capable of widening a view angle and shortening the focal length of the display panel 110. For example, a convex lens having a convex surface on which light is emitted can be selected as the optical lens 180. The optical lens 180 can be disposed between the first and second housings 190a and 190b.

The first mirror 160a is disposed at a front of the optical lens 180. The first mirror 160a serves to reflect, in a horizontal direction, an image (or light) which is emitted through the optical lens 180 and incident in a vertical direction. The first mirror 160a changes a light path from the vertical direction to the horizontal direction. To this end, the first mirror 160a is mounted with a first slope.

The light guide 170 is disposed between the first and second mirrors 160a and 160b. The one side of the light guide 170 is in contact with the first mirror 160a and the other side is in contact with the second mirror 160b. The light guide 170 serves to guide the image (or light) reflected by the first mirror 160a to the second mirror 160b.

The second mirror 160b is disposed at the other side of the light guide 170. The second mirror 160b serves to reflect, in the vertical direction, an image (or light) which penetrates the light guide 170 and is incident in the horizontal direction. That is, the second mirror 160b changes a light path from the horizontal direction to the vertical direction. To this end, the second mirror 160b is mounted with a second slope symmetrical to the first slope. The second mirror 160b can be selected as a semi-transmissive mirror (half mirror) capable of transmitting light incident from the outside as well as reflecting an image displayed on the display panel 110, but is not limited thereto.

As briefly described above, the augmented/virtual display device 110 displays an image displayed on the display panel 110 via the display lens 180. So, the data for image representation which is commonly used cannot be used as it is, and image processing for compensation which considers distortion of a lens is necessary. The description for this is added as follows Barrel distortion refers to a distortion that occurs when an image passes through a convex lens. As shown in FIG. 7, due to the barrel distortion, an image is expressed in a form in which a central region is curved outward. This phenomenon is conspicuous in a lens having a small focal length, such as a fisheye lens. Pincushion distortion refers to a distortion that occurs when the image passes through a concave lens. As shown in FIG. 7, due to the pincushion distortion, the image is expressed in a form in which a central region is curved inward.

As seen from the description above, image distortion occurs according to the type of the lens, and users view the image transmitted through the optical lens 180 in the augmented/virtual reality device 100, so image processing for compensating for the distortion owing to the lens must be performed. When a normal image passes through a convex lens or a concave lens, distortions shown in FIG. 7 happen. Therefore, in order for a user to view a normal image without distortion, it is necessary to compensate the image considering the type of a finally transmitted lens.

Hereinafter, in order to facilitate the understanding of the present invention, an experimental example will be briefly described and an embodiment of the present invention capable of solving or addressing the problems in the experimental example will be described.

An Experimental Example

Figure 8:
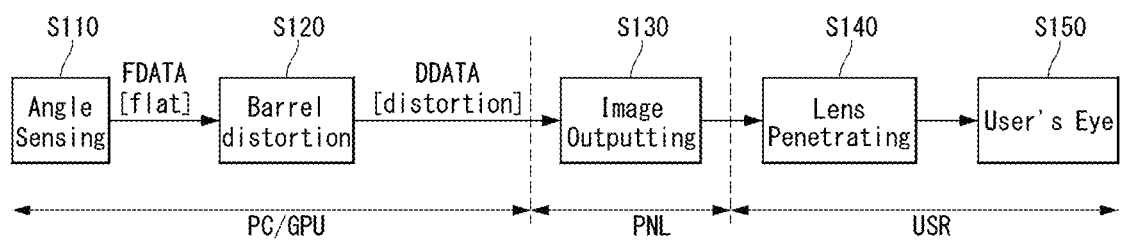
FIG. 8 is a view for explaining an image implementation process according to an experimental example.
Figure 9:
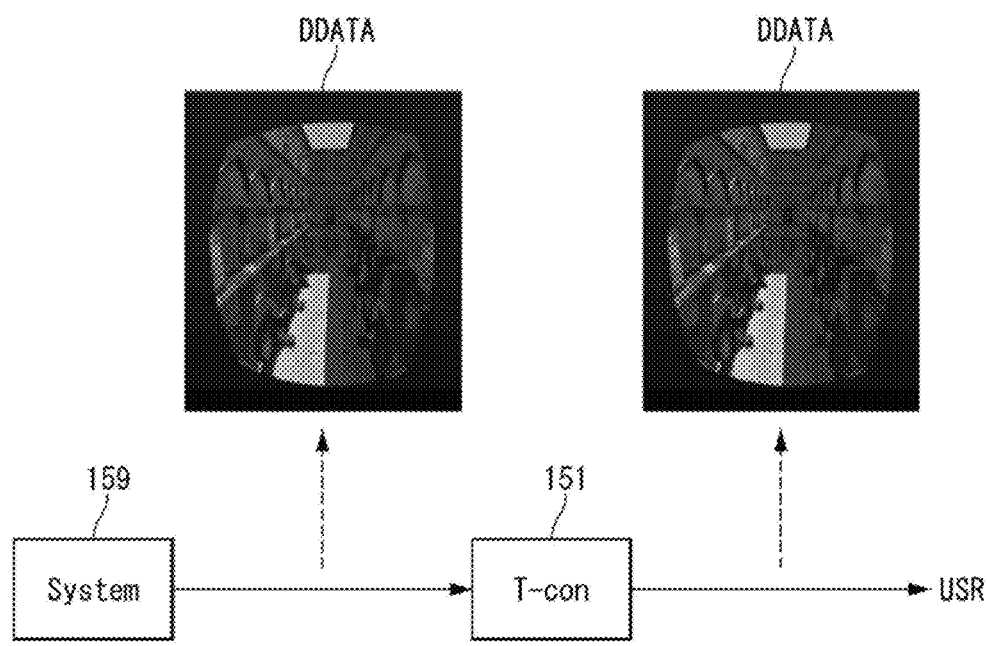
FIG. 9 is a view showing a part of an augmented/virtual reality device according to an experimental example and the shapes of images output from these.

FIG. 8 is a view for explaining an image implementation process according to an experimental example, and FIG. 9 is a view showing a part of an augmented/virtual reality device according to an experimental example and the shapes of images output from the device.

As shown in FIGS. 8 and 9, the experimental example includes an angle sensing step S110, a distortion forming step S120, an image outputting step S130, a lens penetrating step S140 and a step of transmitting to the user's eye S150.

The angle sensing step S110 and the distortion forming step S120 are performed in an image processing unit 159 included in a system such as a graphic processing unit GUI or a personal computer PC. The image outputting step S130 is performed in the timing controller 151 included in a display module PNL. The lens penetrating step S140 and the step of transmitting to user's eye S150 are performed in the side of a user USR.

The image represented via an augmented/virtual reality device thus reaches the user's eye through a lens. The experimental example makes the distortion (e.g., barrel distortion) that can compensate for distortion caused by a lens in advance via the graphic processing unit GUI or the personal computer PC.

The experimental example consumes a lot of time to give distortions to flat image data FDATA. So, the experimental example has shown that motion to photon (the time required for the motion that causes dizziness to a user to fully be reflected on a screen) becomes longer and causes dizziness. Since the experimental example consumes a lot of time to give distortion, as a resolution increases, it is difficult to accommodate an increasing computation amount due to an increase in the number of pixels to be processed. Therefore, the experimental example shows that the time for image generation is also increased.

The result of studying the cause of the above problem in the experimental example shows that the processing for compensating an image that gives distortion to an image consumes a lot of time, and this processing plays a big role in an increase of the computation amount of an image processing unit (a calculation amount for image distortion is added to an existing calculation amount).

A First Embodiment

Figure 10:
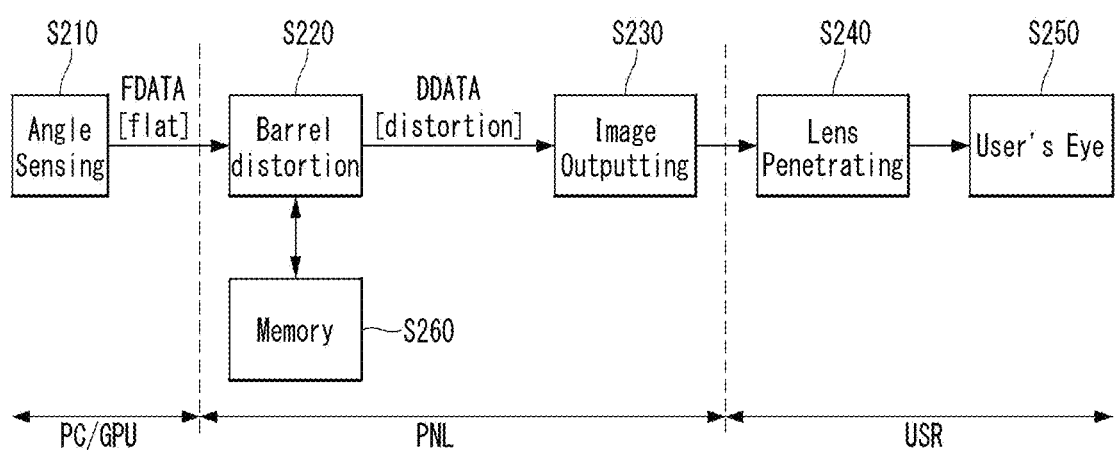
FIG. 10 is a diagram for explaining an image implementation process according to a first embodiment of the present invention.
Figure 11:
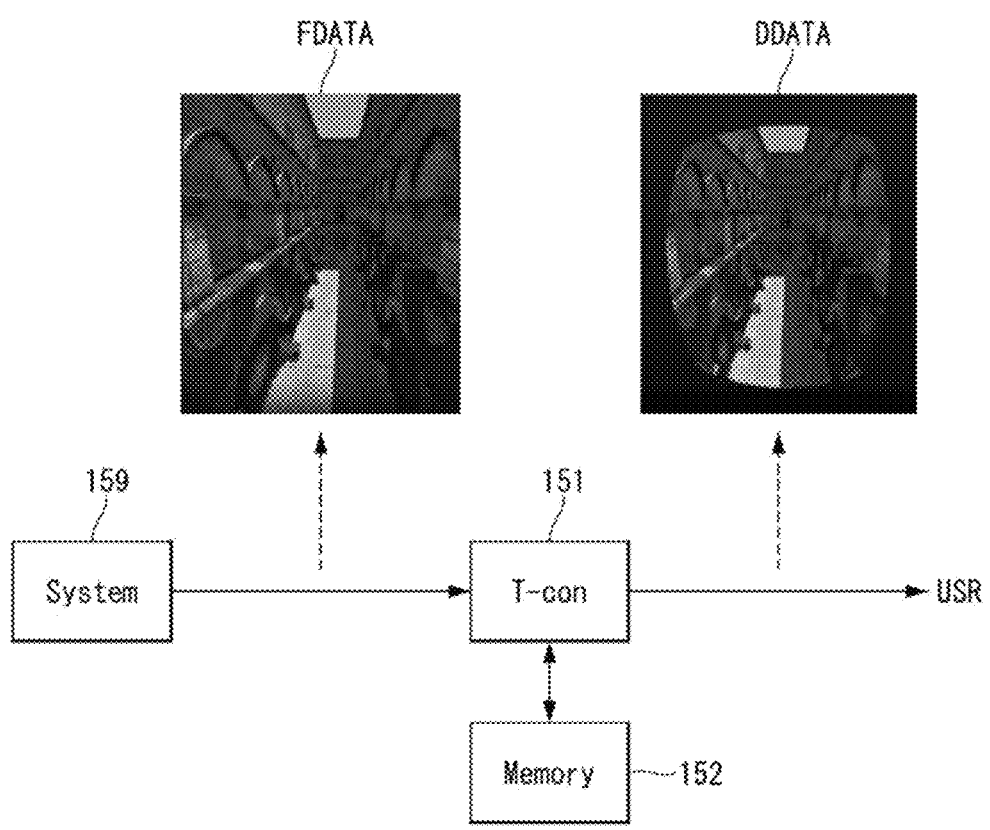
FIG. 11 is a view showing a part of an augmented/virtual reality device according to the first embodiment of the present invention and the shapes of images output from these.
Figure 12:
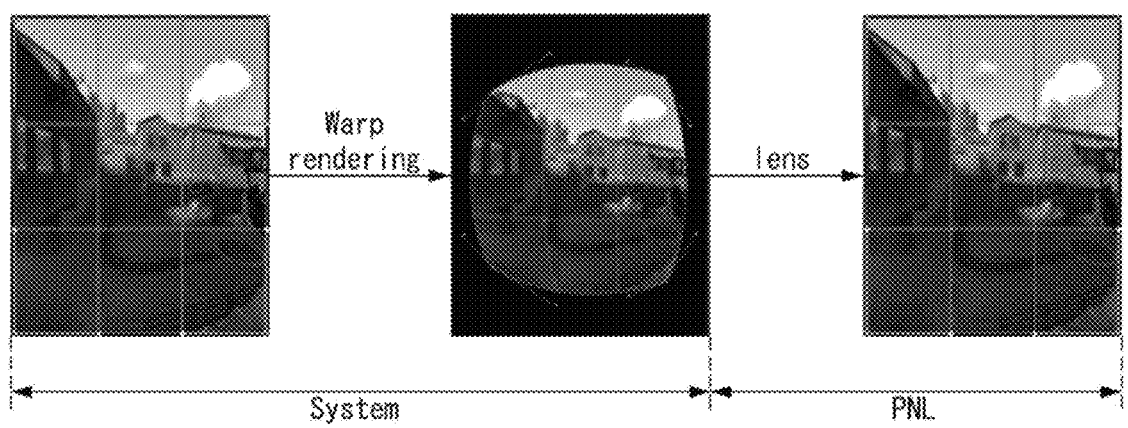
FIG. 12 is a diagram showing a difference between the experimental example and the first embodiment.
Figure 12:
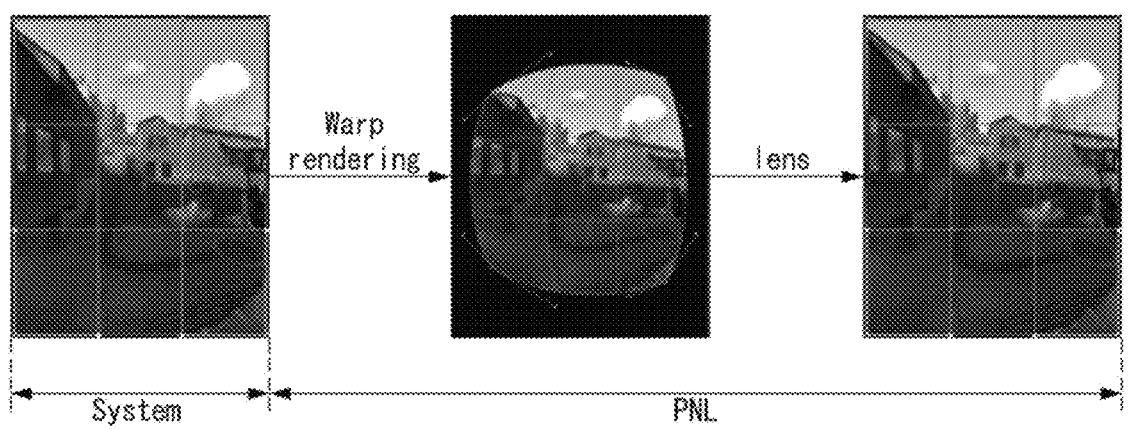

FIG. 10 is a diagram for explaining an image implementation process according to a first embodiment of the present invention, FIG. 11 is a view showing a part of an augmented/virtual reality device according to the first embodiment of the present invention and the shapes of images output from these, and FIG. 12 is a diagram showing a difference between the experimental example ((a) of FIG. 12) and the first embodiment ((b) of FIG. 12).

As shown in FIGS. 10 and 11, the augmented/virtual reality device according to the first embodiment of the present invention includes an angle sensing step S210, a distortion forming step S220, an image outputting step S230, a lens penetrating step S240 and a step of transmitting to user's eye S250.

The angle sensing step S210 is performed in an image processing unit 159 included in a system such as a graphic processing unit GUI or a personal computer PC. The distortion forming step S220 and the image outputting step S230 are performed in the timing controller 151 included in a display module PNL. The lens penetrating step S240 and the step of transmitting to user's eye S250 are performed in the side of a user USR.

The angle sensing step S210 is a step of sensing a viewing direction in which the user wearing the augmented/virtual reality device is looking and obtaining angle information. If the viewing direction of the user is sensed at the angle sensing step, it is possible to perform image processing for compensation and image rendering based on the user. Since the augmented/virtual reality device can represent various image effects based on the viewing direction, it is advantageous to perform the angle sensing but the angle sensing can be omitted.

The image processing unit 159 serves as an image source for the graphic processing unit GPU or the personal computer PC, and outputs flat image data (general image data) FDATA supplied from the outside with the angle information as they are.

The distortion forming step S220 is a step for performing the image processing for compensation which changes the flat image data FDATA into distorted image data DDATA. The timing controller 151 performs the image processing for compensation through a step S260 of reading/writing at least one memory unit 152. The timing controller 151 makes a distortion (e.g. barrel distortion) which compensates the distortion caused by a lens in advance.

The image outputting step S230 is a step for outputting the distorted image data DDATA formed in the timing controller 151. The timing controller 151 can process and output the image data DDATA distorted in accordance with a resolution of a display panel or the like. The distorted image data DDATA output from the timing controller 151 is applied to a display panel via a data driver.

The lens penetrating step S240 is a step in which an image based on the distorted image DDATA displayed on the display panel penetrates a lens. The image passing through the lens is reflected on a mirror or the like and formed on a portion where the eye of the user USR is located.

The step of transmitting to user's eye S250 is a step in which the image displayed on the display panel is finally transmitted to the user's eye. The user USR vies the image reflected on a mirror or the like.

In the experimental example as shown in (a) of FIG. 12, the warp rendering (Warp rendering) of image processing for compensation is performed at the image processor unit 159 included in a system (System). That is, the system compensates the distortion of a lens at the side of the system System. On the other hand, in the embodiment as shown in (b) of FIG. 12, the warp rendering (Warp rendering) of image processing for compensation is performed at the timing controller 151 included in a display module PNL. That is, the distortion of the lens is compensated by the display module PNL located at the rear end of the system (System).

As can be seen from the experimental example ((a) of FIG. 12), the warp rendering operation for distorting an image causes various problems such as an increase in the time for generating an image or image processing delay as a resolution increases.

The embodiment of the present invention ((b) of FIG. 12) changes the flat image data FDATA into the distorted image data DDATA using the timing controller 151 in order to solve the image processing delay due to the increase in the computation amount or load of the image processing unit 159. That is, the embodiment distributes (or lowers) the warp rendering job that increases the workload of the image processing unit 159 to the timing control unit 151, thereby reducing the motion to photon and realizing smooth and stable image rendering.

To this end, the timing controller 151 can perform distortion compensation in cooperation with at least one memory unit. This will be described in more detail in the following second embodiment.

The second embodiment of the present invention described below is based on the first embodiment, but more specifically describes a part of the device in order to achieve this. So, a portion corresponding to the second embodiment will be specifically described while a portion described in the first embodiment will be omitted or will be described briefly.

A Second Embodiment

Figure 13:
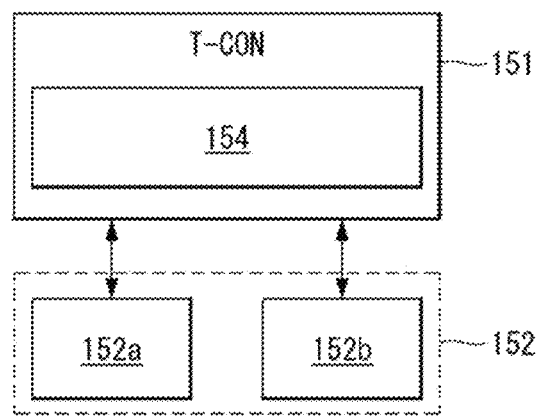
FIG. 13 shows a timing controller and a memory unit according to a second embodiment of the present invention.
Figure 14:
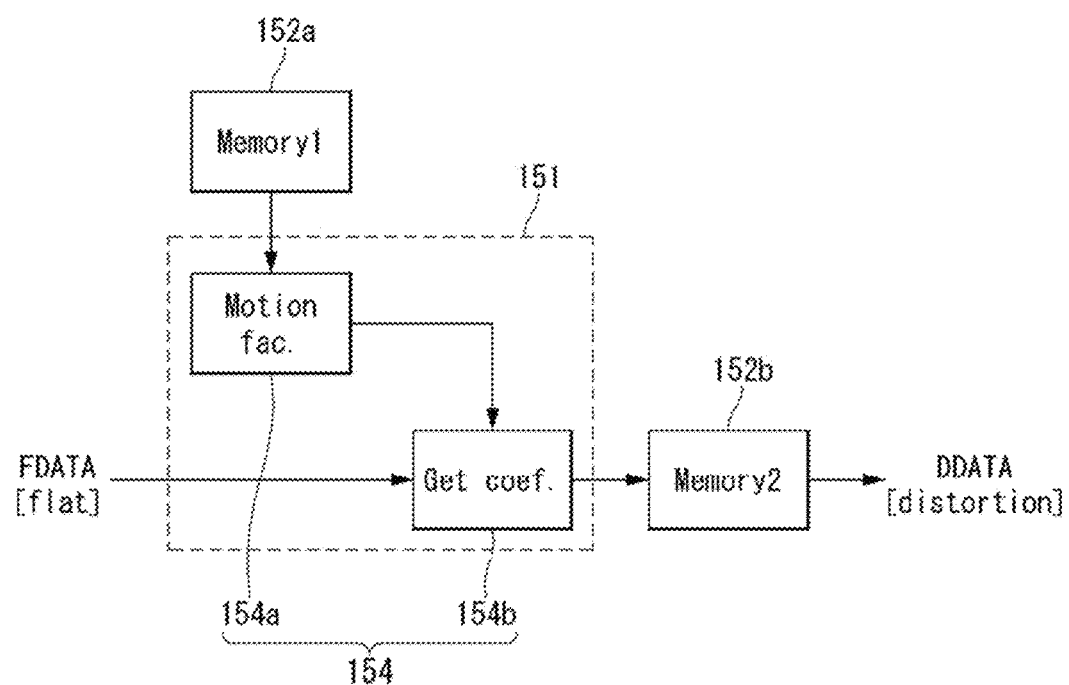
FIG. 14 is a view for explaining a method of interlocking between a configuration included in the timing controller and the memory unit.
Figure 15:
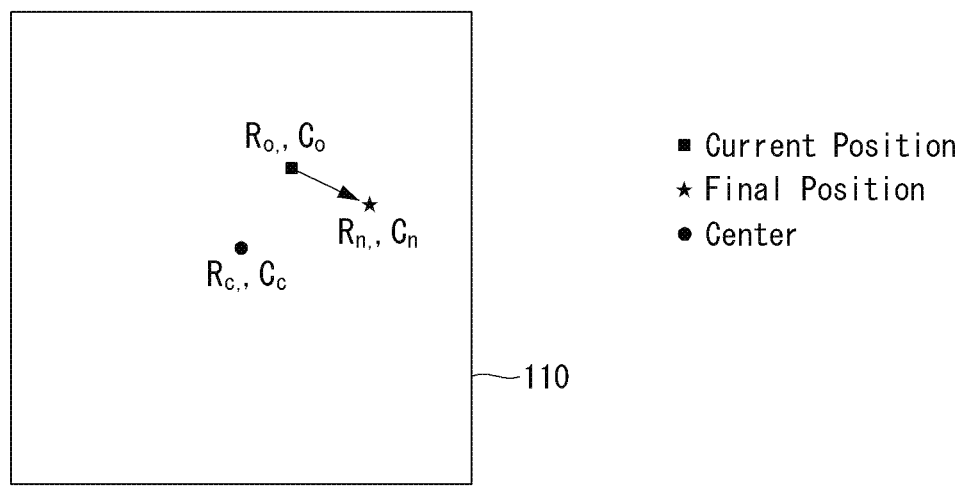
FIG. 15 is a diagram for explaining a portion related to a motion factor of a distortion information transmitting unit of FIG. 14.
Figure 16:
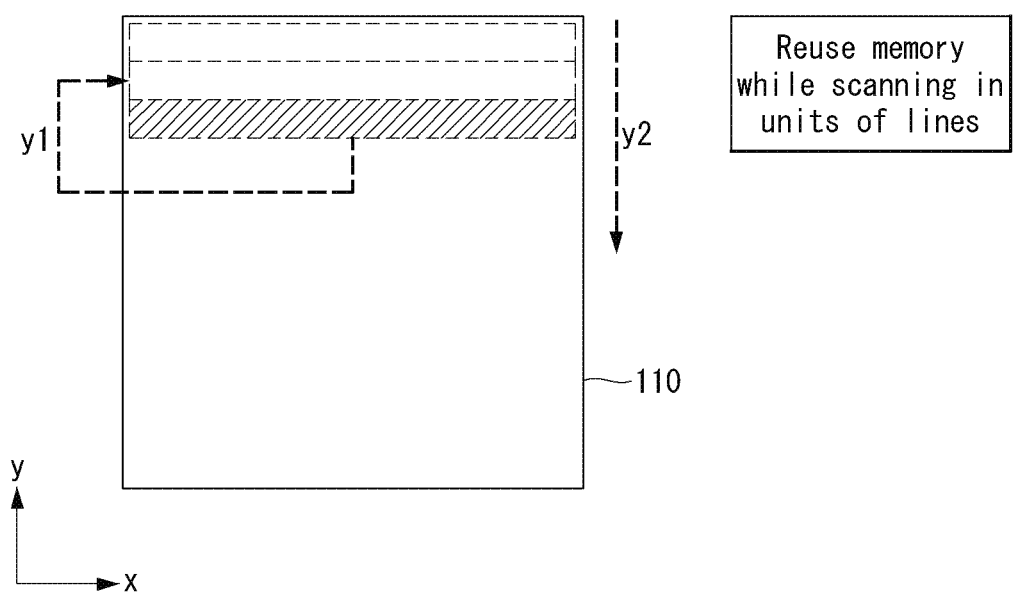
FIGS. 16 to 18 are views for explaining memory reusability according to scan methods.
Figure 17:
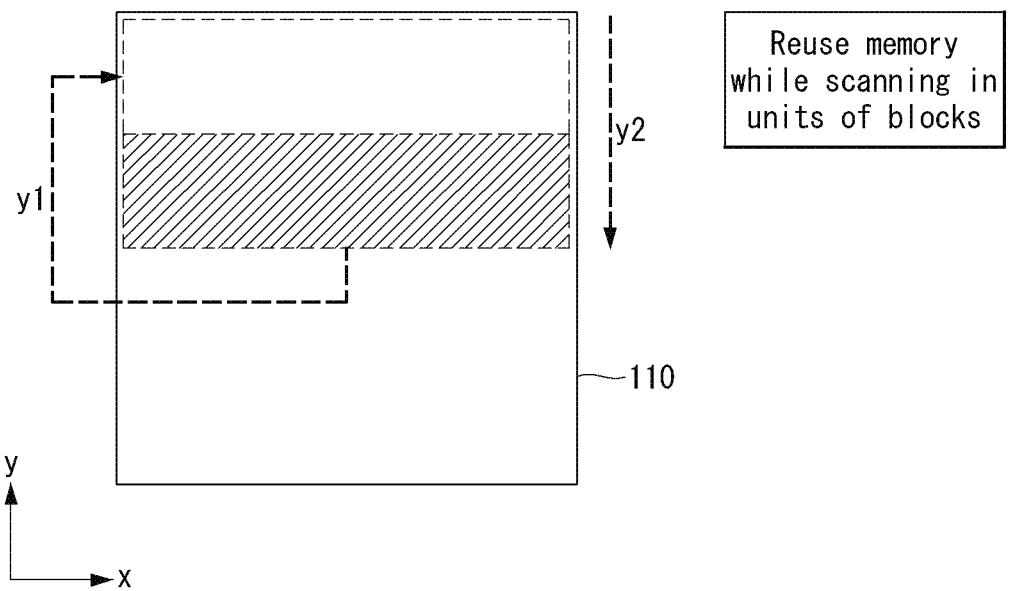
Figure 18:
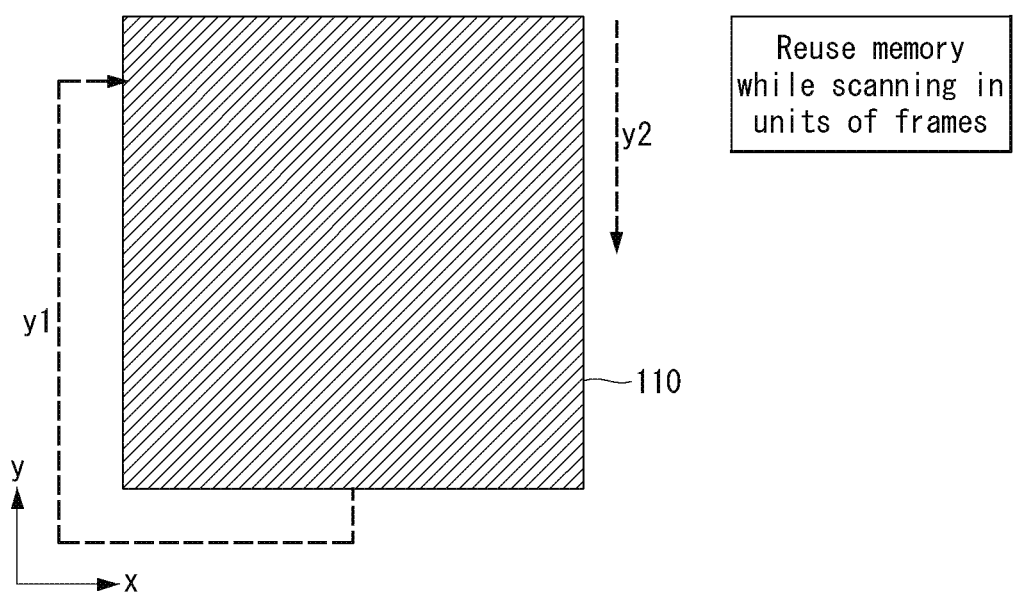

FIG. 13 shows a timing controller and a memory unit according to the second embodiment of the present invention. FIG. 14 is a view for explaining a method of interlocking between a configuration included in the timing controller and the memory unit according to the second embodiment of the present invention. FIG. 15 is a diagram for explaining a portion related to a motion factor of a distortion information transmitting unit of FIG. 14. FIGS. 16 to 18 are views for explaining memory reusability according to scan methods.

As shown in FIGS. 13 to 15, the timing controller 151 includes a memory unit 152 located inside or outside. The memory unit 152 includes a first memory 152a and a second memory 152b. The timing control unit 151 is interlocked with the memory unit 152.

The timing controller 151 comprises a distortion compensating unit 154 which performs image processing for compensation considering lens distortion. The distortion compensating unit 154 includes a distortion information transmitter 154a and a distortion information granter 154b. The distortion information transmitter 154a is interlocked with the first memory 152a and the distortion information granter 154b is interlocked with the second memory 152b.

The first memory 152a stores motion factor and lens distortion information. The lens distortion information can comprise data stored in the form of a lookup table according to types of lenses. The data constituting the lookup table can be provided according to the types of the lenses, or can give different gain values depending on positions of lenses.

The distortion information transmitter 154a reads and transmits the lens distortion information for each position of the flat image data FDATA sequentially input from the outside. Each time the flat image data FDATA is inputted from the outside, the distortion information transmitter 154a reads out the lens distortion information for each position in cooperation with the first memory 152a (retrieving the lens distortion information from the lookup table) and transmits it to the distortion information granter 154b located at the rear end.

The distortion information transmitter 154a establishes a ratio of a point to be positioned from a center of an image in cooperation with the first memory 152a. For instance, the distortion information transmitter 154a can obtain a motion factor based on FIG. 15 and the following equations. In the following equations, Re and Cc denote the coordinate of a center, Ro and Co denote the coordinate of a current position, and Rn and Cn denote the coordinate of a final position.

$$Rn=(Rc-Ro)*motion\_factor+Rc$$

$$Cn=(Cc-Co)*motion\_factor+Cc$$

The motion factor can be changed depending on the characteristics of a lens, that is the design of the lens. An, the required capacity of the first memory 152a can also be determined by the motion factor.

The distortion information granter 154b serves to give distortion information to the flat image data FDATA to generate distorted image data DDATA. The distortion information granter 154b calculates the final coordinate information related to the position to reached based on the current position information of the flat image data FDATA and the lens distortion information transmitted from the distortion information transmitter 154a (calculation for a corrected coordinate generation) and grants distortion information to a position which needs to be distorted. The distorted image data DDATA generated via the distortion information granter 154b is stored at the second memory 152b (the writing of the distorted image data).

The second memory 152b is a memory which stores the distorted image data DDATA. For example, the second memory 152b can have the size of "a resolution of a display panel*(maximum vertical displacement distance*n)*(24 bits+position information)", instead of having the size of a final image resolution. Here, n can be defined as an integer equal to or greater than 1.

According to the second embodiment, the timing controller 151 can perform the image processing for compensation which generates the distorted image data DDATA from the flat image data FDATA while re-using the second memory 152b in the scan methods as shown in FIGS. 16 to 18. In the image processing for compensation, frame delay does not occur as the reusability of the second memory 152b of the timing controller 151 increases. Depending on the scan method, the delay time is expected to be about the maximum vertical displacement distance*n.

As shown in FIG. 14, the timing controller 151 can reuse the second memory 152b while scanning the image data to be displayed on the display panel 110 in units of n lines (n is an integer of 1 or more). In case that image data is scanned in the method of FIG. 14, the second memory 152b is selected as a line memory.

As shown in FIG. 15, the timing controller 151 can reuse the second memory 152b while scanning the image data to be displayed on the display panel 110 in units of n blocks. In case that image data is scanned in the method of FIG. 15, the second memory 152b is selected as a line memory.

As shown in FIG. 16, the timing controller 151 can reuse the second memory 152b while scanning the image data to be displayed on the display panel 110 in units of n frames. In case that image data is scanned in the method of FIG. 15, the second memory 152b is selected as a frame memory.

Among FIGS. 14 to 16, the method, the highly reusable schemes of the second memory 152b are n line-by-line scan method and n block-by-block scan method. The n frame-by-frame scan method is lower in its reusability of the second memory 152b than the two methods described above.

Since the n line-by-line scan method and the n block-by-block scan method perform computations based on a line memory, it is advantageous that the image processing for compensation can be performed in real-time whenever image data is input. However, since the n frame-by-frame scan method must process a large amount of images while accumulating image data, it can be difficult to perform the image processing for compensation in real time.

For this reason, the n line-by-line scan method and the n block-by-block scan method can process a small amount of image quickly, but the n frame-by-frame scan method is lower in its reusability of a memory than the n line-by-line scan method and the n block-by-block scan method and is not expected to process an image quickly. Therefore, it is preferable to select the n line-by-line scan method and the n block-by-block scan method, if real-time image processing is required.

The embodiments of the present invention provide an augmented/virtual reality device and a method of driving the same that can reduce a load due to lens distortion compensation. And, the embodiments of the present invention distribute (or lower) the warp rendering job that increases a workload to a display module side but not to a system, thereby reducing the motion to photon and realizing smooth and stable image rendering. Also, the embodiments of the present invention have the effect of increasing the reusability of a memory in addition to the fast computation and performing image processing for compensation in real time.

What is claimed is:

1. A personal immersion display device, comprising:
a display panel configured to display an image;
a driver configured to drive the display panel;
an optical lens configured to receive the image displayed on the display panel and pass the image through the optical lens; and
a timing controller configured to:
    perform an image processing for compensation which converts flat image data input from outside into distorted image data and supply the distorted image data to the driver wherein the timing controller includes:
    a distortion information transmitter configured to read lens distortion information for each position of the flat image data sequentially input from the outside in cooperation with a first memory which stores a lookup table for converting the flat image data into the distorted image data, and
    a distortion information granter configured to perform a calculation for corrected coordinate generation based on current position information of the flat image data and the lens distortion information transmitted from the distortion information transmitter and grant distortion information to a position to be distorted,
wherein the distortion information granter stores the distorted image data granted with the distortion information in a second memory, and wherein the timing controller is further configured to perform the image processing for compensation while reusing the second memory.

2. The personal immersion display device of claim 1, wherein the timing controller comprises a distortion compensating unit which performs the image processing for compensation in consideration of lens distortion, and
wherein the distortion compensating unit is configured to convert the flat image data into the distorted image data via an operation based on the lookup table.

3. The personal immersion display device of claim 2, wherein the distortion compensating unit comprises the distortion information transmitter.

4. The personal immersion display device of claim 3, wherein the distortion compensating unit further comprises the distortion information granter.

5. The personal immersion display device of claim 1, wherein the timing controller is configured to convert the flat image data into the distorted image data while scanning image data to be displayed on the display panel in units of n lines or n blocks, where n is an integer of 1 or more.

6. The personal immersion display device of claim 1, wherein the second memory is a line memory.

7. A method for driving a personal immersion display device comprising a display panel for displaying image, a driver for driving the display panel, an optical lens receiving the image displayed on the display panel and passing the image through the optical lens, and a timing controller for controlling the driver, the method comprising:
receiving flat image data from outside;
converting, by the timing controller, the flat image data into distorted image data via an operation based on a lookup table stored in a first memory; and
performing, by the timing controller, an image processing for compensation which converts the flat image data input from the outside into distorted image data and supplying the distorted image data to the driver,
wherein the converting the flat image data comprises:
reading lens distortion information for each position of the flat image data sequentially input from the outside by referring to the lookup table stored in the first memory; and
performing a calculation for corrected coordinate generation based on current position information of the flat image data and the lens distortion information and granting distortion information to a position to be distorted,
wherein the distorted image data granted with the distortion information is stored in a second memory, and
wherein timing controller performs the image processing for compensation while reusing the second memory.

8. The method of claim 7, wherein the converting the flat image data comprises:
converting the flat image data into the distorted image data while scanning image data to be displayed on the display panel in units of n lines or n blocks, where n is an integer of 1 or more.

9. The method of claim 7, wherein the second memory is a line memory.

10. A personal immersion display device, comprising:
a display panel configured to display an image;
a driver configured to drive the display panel;
an optical lens configured to receive the image displayed on the display panel and pass the image through the optical lens; and
a timing controller configured to:
perform an image processing for compensation which converts flat image data input from outside into distorted image data and supply the distorted image data to the driver,
wherein the timing controller comprises a distortion compensating unit which performs the image processing for compensation in consideration of lens distortion,
wherein the distortion compensating unit is configured to convert the flat image data into the distorted image data via an operation based on a lookup table,
wherein the distortion compensating unit comprises a distortion information transmitter which reads lens distortion information for each position of the flat image data sequentially input from the outside in cooperation with a first memory which stores the lookup table,
wherein the distortion compensating unit further comprises a distortion information granter which performs a calculation for corrected coordinate generation based on current position information of the flat image data and the lens distortion information transmitted from the distortion information transmitter and grants distortion information to a position which needs to be distorted,
wherein the distortion information granter stores the distorted image data granted with the distortion information in a second memory,
wherein the second memory is a line memory, and
wherein the timing controller is configured to perform the image processing for compensation while reusing the second memory.

11. The personal immersion display device of claim 10, wherein the timing controller is further configured to:
convert the flat image data into the distorted image data while scanning image data to be displayed on the display panel in units of n lines or n blocks, where n is an integer of 1 or more.

12. The personal immersion display device of claim 10, wherein the second memory is a line memory.

* * * * *